(12) United States Patent
Ojha et al.

(10) Patent No.: US 10,439,887 B2
(45) Date of Patent: Oct. 8, 2019

(54) GENERIC TEST FRAMEWORK FOR SERVICE INTERFACES

(71) Applicant: Sungard Availability Services, LP, Wayne, PA (US)

(72) Inventors: Sonal Ojha, Maharashtra (IN); Nischal Vohra, Maharashtra (IN)

(73) Assignee: Sungard Availability Services, LP, Wayne, PA (US)

( * ) Notice: Subject to any disclaimer, the term of this patent is extended or adjusted under 35 U.S.C. 154(b) by 116 days.

(21) Appl. No.: 15/013,176

(22) Filed: Feb. 2, 2016

(65) Prior Publication Data

US 2017/0222883 A1    Aug. 3, 2017

(51) Int. Cl.
| | |
|---|---|
| *G06F 15/173* | (2006.01) |
| *H04L 12/24* | (2006.01) |
| *H04L 29/08* | (2006.01) |
| *G06F 11/36* | (2006.01) |

(52) U.S. Cl.
CPC ........ *H04L 41/145* (2013.01); *G06F 11/3664* (2013.01); *H04L 41/0806* (2013.01); *H04L 67/10* (2013.01)

(58) Field of Classification Search
CPC .............. H04L 41/145; G06F 11/3664; G06F 11/3688; G06F 11/3684
USPC .................................................. 709/224, 220
See application file for complete search history.

(56) References Cited

U.S. PATENT DOCUMENTS

| | | | |
|---|---|---|---|
| 7,082,376 B1 * | 7/2006 | Robinson .............. | G06F 11/263 702/121 |
| 7,506,311 B2 | 3/2009 | Subramanian et al. | |
| 9,015,532 B2 | 4/2015 | Hong | |
| 9,489,488 B2 * | 11/2016 | Dean ................... | G06F 11/3664 |
| 9,521,062 B2 * | 12/2016 | Anderson, Jr. ......... | H04L 43/50 |
| 9,529,698 B2 * | 12/2016 | Tan ..................... | G06F 11/3672 |

(Continued)

OTHER PUBLICATIONS

Nabil El Ioini et al., "Open Web Services Testing" 2011 IEEE World Congress, Jul. 4, 2011, pp. 130-136.

(Continued)

*Primary Examiner* — David R Lazaro
*Assistant Examiner* — Mariegeorges A Henry
(74) *Attorney, Agent, or Firm* — David J. Thibodeau, Jr.; VLP Law Group LLP

(57) ABSTRACT

A generic framework for testing service interfaces where attributes for service access are abstracted from test execution attributes. An eXtensible Markup Language (XML) Service Attribute (SA) file may be used to define a server tag and one or more services tags. The server tag specifies protocol, address, and other access information for a host machine that provides the service. A service type and configuration parameter defaults may also be included with the server tag. Each service tag defines a name of a corresponding service, and a request-response configuration for the corresponding service. With this information in hand, a test executor can then issue a request message to the corresponding service indicated in the service tag, using the protocol and address information and request configuration, and match the response received against the response configuration. A separate Test Execution (TE) file may specify attributes of the test including hardware parameters, sequential/parallel execution, or the like.

13 Claims, 20 Drawing Sheets

(56) References Cited

U.S. PATENT DOCUMENTS

| | | | |
|---|---|---|---|
| 2003/0126195 A1* | 7/2003 | Reynolds | G06F 1/14 709/203 |
| 2006/0112180 A1 | 5/2006 | Vedula | |
| 2007/0016893 A1* | 1/2007 | Branda | G06F 11/3447 717/127 |
| 2009/0319832 A1 | 12/2009 | Zhang et al. | |
| 2011/0131398 A1* | 6/2011 | Chaturvedi | H04L 41/0813 713/1 |
| 2012/0059919 A1* | 3/2012 | Glaser | G06F 11/3664 709/223 |
| 2013/0055028 A1 | 2/2013 | Patil et al. | |
| 2014/0089900 A1* | 3/2014 | Shrivastava | G06F 9/44589 717/126 |
| 2016/0239409 A1* | 8/2016 | de Oliveira Staudt | G06F 11/3688 |

OTHER PUBLICATIONS

International Search Report and Written Opinion dated Mar. 27, 2017 for International Application No. PCT/US2017/015580 international file date Jan. 30, 2017, 15 pages.

Robot Framework, Generic test automation framework for acceptance testing and ATDD data sheet, 5 pages. robotframework.org (http://robotframework.org) retrieved from the Internet Oct. 1, 2015.

Robot Framework User Guide, Version 3.1.1, 132 pages, retrieved from the Internet May 6, 2019.

An Introduction to Robot Framework, 16 pages, robotframework.org (http://robotframework.org) retrieved from the Internet.

* cited by examiner

```
XM skeleton
<definitions>
    <display-name>User friendly name</display-name>
310 ── <server>
    401 ── <name>User friendly name</name>
    402 ── <address>ip / url</address>
    403 ── <port></port>
    404 ── <protocol>http/https/tcp/udp</protocol>
    405 ── <service-type>soap/rest/rmi/irc/custom</service-type>
    406 ── <format>xml/json/text/binary</format>
    407 ── <config-params>
            <config-param>
                <name>token name to be used later</name>
                <value>value to be used</value>
                <type>param/wsdl/stub/uri-prefix/uri-suffix</type>
            </config-param>
        </config-params>
    </server>
320 ── <services>
        <service>
    420 ── <name>User friendly name to uniquely identify this service</name>
    421 ── <execute>True/False</execute>
    422 ── <depends-on>
            <services>
                <servoce>Name of the service whose o/p needs to be fed to this services
                following param details</service>
            </services>
        </depends-on>
    430 ── <request>
        431 ── <name>Name/url of service/api/command</name>
        432 ── <format>xml/json/text/binary; if not defined the server one will be
                used</format>
        435 ── <params>
                <param>
                    <name></name>
                    <value></value>

<type>int/long/float/string/boolean/uri-param/uri-suffix/http-body/ht
                    tp-header/http-method</type>
                </param>
            </params>
        </request>
    440 ── <response>
        441 ── <status-code></status-code>
        442 ── <status></status>
        443 ── <format>xml/json/json-array/text/bindary; if not defined the server one will
                be used</format>
        444 ── <params>
                <param>
                    <name></name>
                    <value></value>
                    <type>int/long/float/string/boolean</type>
                </param>
            </params>
        </response>
    </service>
</services>
</definitions>
```

FIG. 4

```
EXAMPLE REST XML
<?xml version="1.0" encoding="UTF-8"?>
<definitions xmlns:xsi="http://www.w3.org/2001/XML5chema-instance"
xsi:noNamespaceSchemaLocation="apitestsuite.xsd">

<display-name>Generic test framework</display-name>
    <server>
        <name>edison.qa.net</name>
        <address>10.10.10.10</address>
        <protocol>http</protocol>
        <service-type>REST<service-type>
        <port>80</port>
        <format>JSUN</format>
        <config-params>
            <config-param>
                <value>/api/ver1</value>
                <type>uri-prefix</type>
            </config-param>
        </config-params>
    </server>
    <services>
        <service> ∞ </service>
        <service> ∞ </service>
        <service> ∞ </service>
    </services>
```

FROM FIG. 5-1

```xml
<services>
    <service>
        <name>Login</name>
        <execute>True</execute>
        <request>
            <name>login</name>
            <params>
                <param>
                    <name>HTTP_USERNAME</name>
                    <value>sonal.ojha@sungardas.com</value>
                    <type>HTTP_HEADER</type>
                </param>
                <param>
                    <name>HTTP_PASSWORD</name>
                    <value>9d38223f87a9450ea17e083dc5d6effd</value>
                    <type>HTTP_HEADER</type>
                </param>
                <param>
                    <name>HTTP_METHOD</name>
                    <value>GET</value>
                    <type>HTTP_HEADER</type>
                </param>
            </params>
        </request>
        <response>
            <status-code>200</status-code>
            >status>SUCCESS</status>
            <format>JSON</format>
            <params>
                <param>
                    <name>AUTH_TOKEN</name>
                    <type>string</type>
                </param>
            </params>
        </response>
    </service>
    <service> ∞ </service>
    <service> ∞ </service>
</services>
```

FROM FIG. 5-2

```
<service>
    <name>CreateUser</name>
    <execute>True</exectute>
    <depends-on>
        <service>Login</service>
    </depends-on>
    <request>
        <name>users</name>
        <format>JSON</format>
        <params>
            <param>
                <name>HTTP_AUTH</name>
                <value>{AUTH_TOKEN}</value> ({} braces define that the variable
                is defined in the service response param attribute)
                <type>HTTP_HEADER</type>
            </param>
            <param>
                <name>HTTP_METHOD</name>
                <value>POST</value>
                <type>HTTP_HEADER</type>
            </param>
            <param>
                <name>username</name>
                <value>Sonal.Ojha</value>
                <type>HTTP_BODY</type>
            </param>
            <param>
                <name>email</name>
                <value>Sonal.Ojha@sungardas.com</value>
                <type>HTTP_BODY</type>
            </param>
        </params>
    </request>
    <response>
        <status-code>200</status-code>
        <status>SUCCESS</status>
        <format>JSON</format>
        <params>
            <param>
                <name>USER_ID</name>
                <type>string</type>
            </param>
        </params>
    </response>
</service>
<service> ... </service>
</services>
```

FROM FIG. 5-3

```
        <name>GetUsersInfo</name>
        <execute>True</execute>
        <depends-on>
            <services>
                <service>Login</service>
                <service>CreateUser</service>
            </services>
        </depends-on>
        <request>
            <name>users</name>
            <params>
                <param>
                    <name>HTTP_AUTH</name>
                    <value>{AUTH_TOKEN}</value>  ({} braces define that the variable
                    is defined in the service response param attribute)
                    <type>HTTP_HEADER</type>
                </param>
                <param>
                    <name>HTTP_METHOD</name>
                    <value>GET</value>
                    <type>HTTP_HEADER</type>
                </param>
                <param>
                    <name>isActive</name>
                    <value>True</value>
                    <type>uri-param</type>
                </param>
                <param>
                    <value>{USER_ID}</value>
                    <type>uri-suffix</type>
                </param>
            </params>
        </request>
        <response>
            <status-code>200</status-code>
            <status>SUCCESS</status>
            <format>JSON</format>
            <params>
                <param>
                    <name>EMAIL</name>
                    <type>string</type>
                </param>
            </params>
        </response>
    </service>
</services>
```

FIG. 5-4

```
EXAMPLE SOAP XML
<?xml version="1.0" encoding="UTF-8"?>
<definitions xmlns:xsi="http://www.w3.org/2001/XML5chema-instance"
xsi:noNamespaceSchemaLocation="apitestsuite.xsd">
    <display-name>Generic test framework</display-name>
    <server>
        <name>edison.qa.net</name>
        <ipaddress>10.10.10.10</ipaddress>
        <protocol>https</protocol>
        <service-type>SOAP<service-type>
        <port>443</port>
        <format>XML</format>
        <config-params>
            <config-param>
                <name>uri-prefix</name>
                <path>/api/ver1/soap</path>
            </config-param>
            <config-param>
                <name>wsdls</name>
                <path>http://cs.au.dk/~amoeller/WWW/webservices/</path>
            </config-param>
        </config-params>
        <services> ∞ </services>
    </server>
```

FROM FIG. 6-1

```
<request>
    <name>doGoogleSearch</name>
    <params>
        <param>
            <name>key</name>
            <value>x0x0</value>
            <type>string</type>
        </param>
        <param>
            <name>q</name>
            <value>Sonal</value>
            <type>string</type>
        </param>
        <param>
            <name>start</name>
            <value>0</value>
            <type>integer</type>
        </param>
        <param>
            <name>maxResults</name>
            <value>1</value>
            <type>integer</type>
        </param>
        <param>
            <name>filter</name>
            <value>True</value>
            <type>boolean</type>
        </param>
        <param>
            <name>restrict</name>
            <value></value>
            <type>string</type>
        </param>
        <param>
            <name>safeSearch</name>
            <value>True</value>
            <type>boolean</type>
        </param>
        <param>
            <name>lr</name>
            <value></value>
            <type>string</type>
        </param>
        <param>
            <name>ei</name>
            <value></value>
            <type>string</type>
        </param>
        <param>
            <name>oe</name>
            <value></value>
```

FROM FIG. 6-2

```
<response>
    <param>
        <name>directoryCategories</name>
        <value>
            <param>
                <name>DirectoryCategory</name>
                <value>
                    <param>
                        <name>fullViewableName</name>
                        <type>string</type>
                    </param>
                    <param>
                        <name>specialEncoding</name>
                        <type>string</type>
                    </param>
                </value>
                <type>data</type>
            </param>
        </value>
        <type>array</type>
    </param>
    <param>
        <name>searchTime</name>
        <type>double</type>
    </param>
</params>
</response>
```

FIG. 6-3

```
EXAMPLE IRC XML
<?xml version="1.0" encoding="UTF-8"?>
<definitions xmlns:xsi="http://www.w3.org/2001/XML5chema-instance"
xsi:noNamespaceSchemaLocation="apitestsuite.xsd">
    <display-name>Generic test framework</display-name>
    <server>
        <name>edison.qa.net</name>
        <ipaddress>10.10.10.10</ipaddress>
        <protocol>IRC</protocol>
        <service-type>IRC<service-type>
        <port>6667</port>
        <format>string</format>
    </server>
    <services> ∞ </serices>
</definitions>
```

FROM FIG. 7-1

```xml
<services>
    <service>
        <name>JOIN Command</name>
        <execute>True</execute>
        <request>
            <name>JOIN</name>
            <params>
                <param>
                    <name>channel-name</name>
                    <value>anyname</value>
                    <type>string</type>
                </param>
                <param>
                    <name>key</name>
                    <value>93832727940</value>
                    <type>string</type>
                </param>
            </params>
        </request>
        <response>
            <format>string</format>
            <params>
                <param>
                    <name>Join response</name>
                    <value>RPLTOPIC</value>
                    <type>string</type>
                </param>
            </params>
        </response>
    </service>
```

FROM FIG. 7-2

```
<service>
    <request>
        <name>PING</name>
        <params>
            <param>
                <name>client</name>
                <value>wizkid</value>
                <type>string</type>
            </param>
        </params>
    </request>
    <response>
        <format>string</format>
        <params>
            <param>
                <name>Ping response</name>
                <value>PONG</value>
                <type>string</type>
            </param>
    <service>
```

FROM FIG. 7-3

```
<service>
    <name>QUIT</name>
    <execute>True</execute>
    <request>
        <name>QUIT</name>
        <params>
            <param>
                <name>Parting comment</name>
                <value>Good bye</value>
                <type>string</type>
            </param>
        </params>
    </request>
    <response>
        <format>string</format>
        <params>
            <param>
                <name>No Resp</name>
            </param>
        </params>
    </response>
</service>
```

FIG. 7-4

```
EXAMPLE RMI XML
<?xml version="1.0" encoding="UTF-8"?>
<definitions xmlns:xsi="http://www.w3.org/2001/XML5chema-instance"
xsi:noNamespaceSchemaLocation="apitestsuite.xsd">
    <display-name>Generic test framework</display-name>
    <server>
        <name>edison.qa.net</name>
        <ipaddress>10.10.10.10</ipaddress>
        <protocol>rmi</protocol>
        <service-type>RMI<service-type>
        <port>1099</port>
        <config-params>
            <config-param>
                <type>stub</type>
                <value>http://server/downloadstubs</value>
            </config-param>
        </config-params>
    </server>
    <services>
        <service>
            <name>AddNumbers</name>
            <execute>True</execute>
            <request>
                <params>
                    <param>
                        <value>3</value>
                        <type>integer</type>
                    </param>
                    <param>
                        <value>2</value>
                        <type>integer</type>
                    </param>
                </params>
            </request>
            <response>
                <status-code>1090</status-code>
                <status>success</status>
                <params>
                    <param>
                        <value>5</value>
                        <type>integer</type>
                    </param
                </params>
            </response>
        </service>
    </services>
```

FIG. 8

```
Next Document:
  server:
    os:[Win7/RedHat/CentOS/Fedora/Ubuntu] ⎫
    ram:[GBs]                              ⎬ 900
    cpu:[GHz]                              ⎭
    cores:[2/4/6/8]
    count:1[/2/3/..]

threadpool:
    min:                ⎫
    max:                ⎬ 910
    incrementfactor:    ⎭ logger:
    dir:[path]              ⎫
    maxsize:[MBs]           ⎬ 920
    backupCount:1[/2/3...]  ⎭
    level:ERROR[INFO/DEBUG/WARNING]

misc:
    emails:[list of event receivers emails] ⎬ 930
    emailfrequency:[in hours]

testsconfig:
    iterations:[No of times the tests should be run] ⎫
    delay:0[delay between iterations in secs]        ⎬ 940
    mode:[sequential/parallel]                       ⎭
```

FIG. 9

Server

Server Details

1001 — Name: *edison.qa.net*  Address: *10.10.10.10*  Port: *8080*

1011 — Protocol: HTTP / HTTPs / TCP / UDP
Service Type: SOAP / REST / RMI / IRC / Custom
Format: XML / JSON / Text / Binary

Server Configuration Parameters

1020 — Name: *(Optional)*  Type: Param / WSDL / Stub / uri-prefix / uri-suffix  Value: *(Value)*  [Add]

Name: *(Optional)*  Type: uri-prefix  Value: */api/ver1/*  [Delete]
Name: *(Optional)*  Type: uri-prefix  Value: */api/ver1/*  [Delete]

Services Configuration

[Add Services]

1030 —

| Service Name | Depends On | Execute | Service Details |
|---|---|---|---|
| Login | N/A | True | *Details* |
| Get Users | Login | True | *Details* |

FIG. 10

Services

Service Details

Name: Login  ← 1110
Depends On: (Optional)
Execute: True / False

Request

Name: login
Format: XML / JSON / Text / Binary

Param(s):

| Name | Value | Type | |
|---|---|---|---|
| (Optional) | | int, long, float, string, boolean, uri-param, uri-suffix, http-body, http-header, http-method | Add |
| HTTP_METHOD | GET | http-method | Delete |

Response

Status: Success
Status Code: 200
Format: XML / JSON / Text / Binary

Param(s):

| Name | Value | Type | |
|---|---|---|---|
| (Optional) | | int, long, float, string, boolean | Add |
| Email | abc@abc.com | String | Delete |

[ Add Service ]

FIG. 11

GENERIC TEST FRAMEWORK FOR SERVICE INTERFACES

BACKGROUND

Technical Field

This patent application relates generally to data processing test methods and apparatus and more particularly to testing a service interface.

Background Information

One important aspect of data processing is the provisioning of various types of services. By "service," we refer to some combination of programming and data made available from one or more data processors to other data processors over a network. In contemporary systems, such services may be provided by local area servers, or more commonly, Internet-remote accessible servers. The services may include file storage services, database services, email services, Web services, search services and the like. In general, such services are accessed through an automated interface, which may specify a set of commands, functions, data, and other elements exposed to access the service. The interface may be an Application Programming Interface (API), Application Binary Interface (ABI) or other forms.

As uses of a service proliferate, concerns of the operation of the service include the effect on the service's performance as demands for that service arise. The result is increased demand for testing service interfaces of different types. Such tests are needed not only to determine if the service behaves logically as expected, but also to evaluate how well the service performs under demand load. Developing applications to test services has thus become a crucial part of offering them.

At the present time varies options exist to expose service interfaces. These include, for example, communication protocols such as Simple Object Access Protocol (SOAP), Representational State Transfer (REST), Remote Method Invocation (RMI), Common Object Request Broker Architecture (CORBA) and the like. With these varied options it becomes more time consuming for developers and their quality assurance team to develop interface-specific test suites.

It is now common for each implementer of a service interface to write their own specialized test suite. Certain unit testing frameworks such as JUnit and PyUnit are available but those are specific to the Java or Python language, and are intended to support functional testing. These tools also typically require a significant detailed coding effort in a specific programming language to properly communicate with other implementations. Other tools such as Postman-REST clients provide a structured platform for constructing collections of commands, but these are specific to particular interface types.

SUMMARY

What is needed is a configuration independent, "generic" test framework that is not dependent upon a particular programming language or service interface type. The framework should permit testing various aspects of the interface including not only its functionality but also performance and load testing. In this approach, a test might be defined by specifying attributes in a open format input file(s) without need for coding work. In one implementation, a service attribute file provides a way to abstract server interface configuration parameters and service specific details needed to test a service interface. The service attribute file also includes request-response constructs containing commands and responses to test the interface. A second test execution file controls the behavior of the tests. The second file may specify whether the test(s) are run sequentially or in parallel, and whether responses should be logged to an output file and so forth.

In one implementation, a framework for testing an interface to a service is provided where service access attributes are abstracted from test execution attributes. The service access (SA) attributes may be provided as an extensible markup language (XML) file containing multiple human-readable elements, such as may be defined by start and end tag sets. The tags include at least one server tag and one or more services tags. The server tag specifies a protocol, address, and other information needed to access a host machine that provides the service. One or more service tags and configuration parameter defaults may also be included within a server tag. Each service tag defines a name of a corresponding service, service dependency criteria, protocol overrides, and parameters for one or more request-response configurations. The order of the service tags specified in the SA file may also define the sequence of tests to be performed.

With this information in hand, a test executor can then interpret the SA file to locate the server, and invoke the service(s) by issuing specified request message(s) to invoke service requests as specified in the corresponding service tag. The request messages may be sent using either the default protocol or service-specific protocol and request configuration. The test executor then determines whether the response matches what was expected as specified in the corresponding response configuration tag.

In some implementations, the server address information includes a uniform resource identifier and port number.

The server tag may also indicate a default message format used for accessing the server; the default can be overridden with a format specification provided in a service tag.

The service tags may additionally indicate parameters to be used in place of the parameter defaults for either the request or response message.

The service response tag may optionally specify a status code indicating a server condition.

In some implementations, the service tags additionally indicate a condition or dependency for the test executor. The condition or dependency may be data or state information to be shared among two services. The est executor can, for example, first fetch or use a token it has previously received in a prior response that satisfies the dependency condition.

A separate test plan configuration file contains further information needed to plan test execution (TE). This TE file, which may also be provided as a text file, controls aspects of test execution. These attributes can include one or more definitions of server hardware parameters, running tests serially or in parallel, test execution, or a number of test iterations.

The generic framework may itself be accessible through a cloud service, and used to test other services.

BRIEF DESCRIPTION OF THE DRAWINGS

The description below refers to the accompanying drawings, of which:

FIG. 4 is an example generic server access file illustrating further details.

FIGS. 5-1 to 5-4 are an example SA file to test a service accessed via REST.

FIGS. 6-1 to 6-3 are an example SA file for testing a Google search service using SOAP.

FIGS. 7-1 to 7-4 are an example SA file for testing an Internet Relay Chat (IRC) service.

FIG. 8 illustrates an SA file for testing a Remote Method Invocation (RMI) interface to an object-oriented programming service.

FIG. 9 is an example Test Execution (TE) file.

FIG. 10 is an example user interface for specifying a server element in an SA file.

FIG. 11 is an example user interface for specifying a services element in a SA file.

DETAILED DESCRIPTION OF AN ILLUSTRATIVE EMBODIMENT

Figure 1:
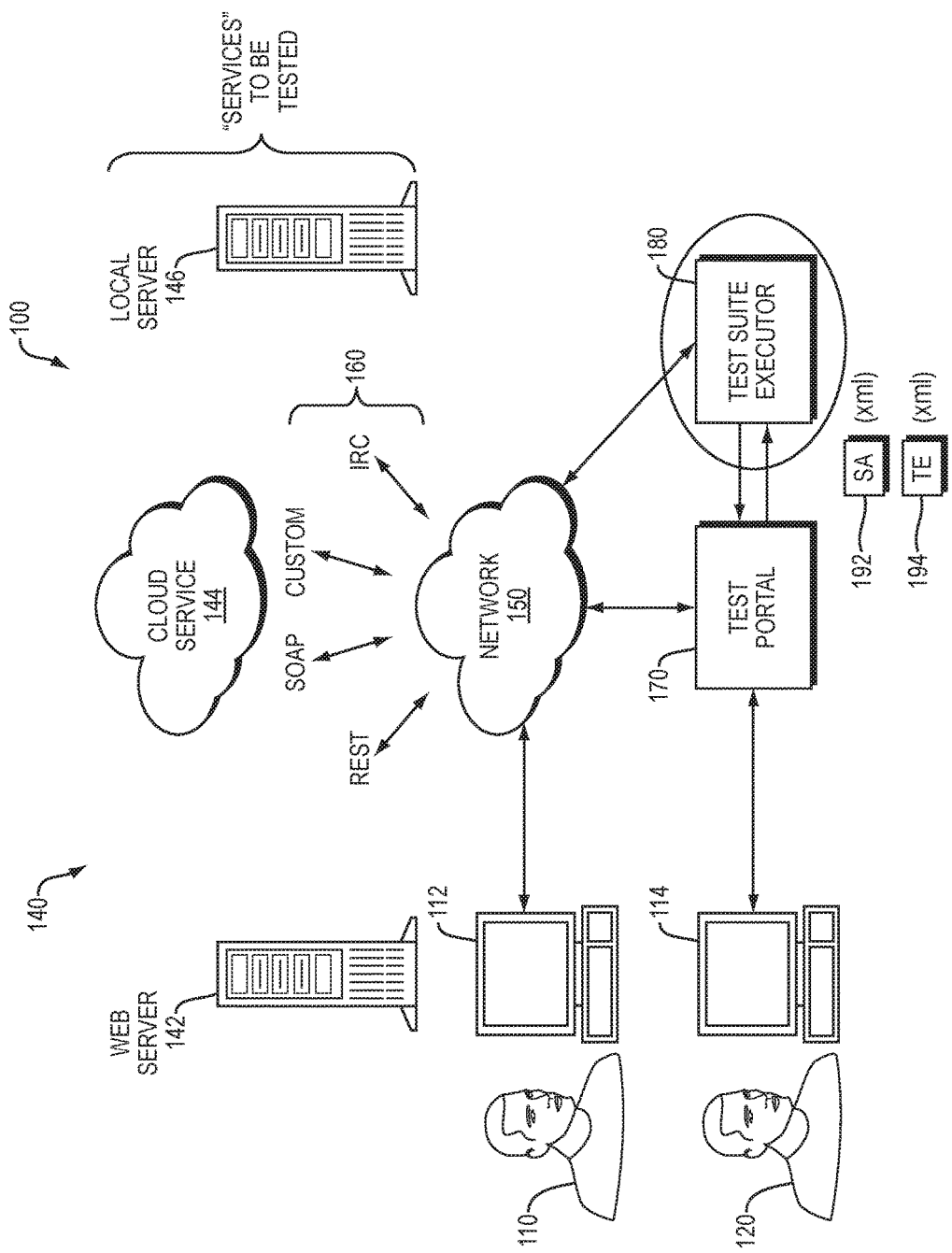
FIG. 1 is a high-level diagram of a data processing environment in which a generic service interface test framework may be utilized.

FIG. 1 is a high-level diagram of a data processing environment 100 in which a generic framework for testing a service interface may be used. In this environment 100 are found a number of different types of users. A first user 110 is an end-user who accesses one or more services 140 through a wide area network connection 150 such as the Internet through a client device 112. The client device 112 may be a laptop, personal computer, smart phone, any other device providing connectivity to a service 140. The first user 110 may use an Application Programming Interface (API) or a software program that leverages an API or some other interface to access the service 140. A second user 120 is a quality assurance user that accesses the services for different purpose. In particular, the second user 120 is primarily concerned with ensuring that the is services 140 operate correctly. While the second user 120 also has their own client device 114, they access the services 140 in a different way from the first user 110, through a test suite executor 180, as described in more detail below.

The services 140 may include any type of programming or data made available by a data processing machine over a network port. The services 140 may include functions provided by a Web server 142, cloud services 144, or services provided by a local server 146. In one example, a service 142 provided by a remote server is a Google search service. In another example, a service 144 may be a secure file storage service such as Dropbox. In yet another example, a local server 146 provides a database service.

Each of the services 142, 144, 146 are accessed via different Application Programming Interfaces (APIs), different protocols, and different parameters. The APIs not only define a command syntax but also communication protocols, parameters and other details needed to access the service. In one example, the protocols may include Representational State Transfer (REST) which provides a coordinated set of constraints for communication with a distributed hypermedia system using Javascript Object Notation (JSON) commands. Another example API may specify Simple Object Access Protocol (SOAP) for exchanging structured information in the implementation of the service. In another example, an Internet Relay Chat (IRC) communication channel service is available via the IRC-specific protocol. It should be understood that custom interfaces are also possible.

The data processing environment 100 provides a generic framework for the administrative user 120 to test interfaces to the services 140. In particular, user 120 uses their client device 114 to access a test suite executor through a test portal 170. The test portal 170 allows the user 120 to develop one or more service attribute and test execution files that are interpreted by the test suite executor 180. The test suite executor 180 then is generates requests to the services 140 and examines the responses received from the services 140 to determine if the responses are as expected.

In one implementation, the test portal 170 allows the administrative user 120 to develop at least two files including a Service Access (SA) attribute file 192 and a Test Execution (TE) attribute file 194. The Service Access (SA) file 192 may be an eXtensible Markup Language (XML) format file that defines attributes of how to access the service(s) to be tested. The XML format or any other preferably human readable format may be used to describe abstract command and data models. In the case of an XML document, the form include units called elements, which contain either parsed or unparsed data. Elements in the SA file 192 may be further defined using a start tag and end tag for each service as described below.

The TE file 194 is separate file that includes test plan configuration information. The TE file (which may also be referred to herein as "the YML file") includes attributes which define how the test suite executor 180 is to run the test. It may also be in the form of a human-readable text file.

Figure 2:
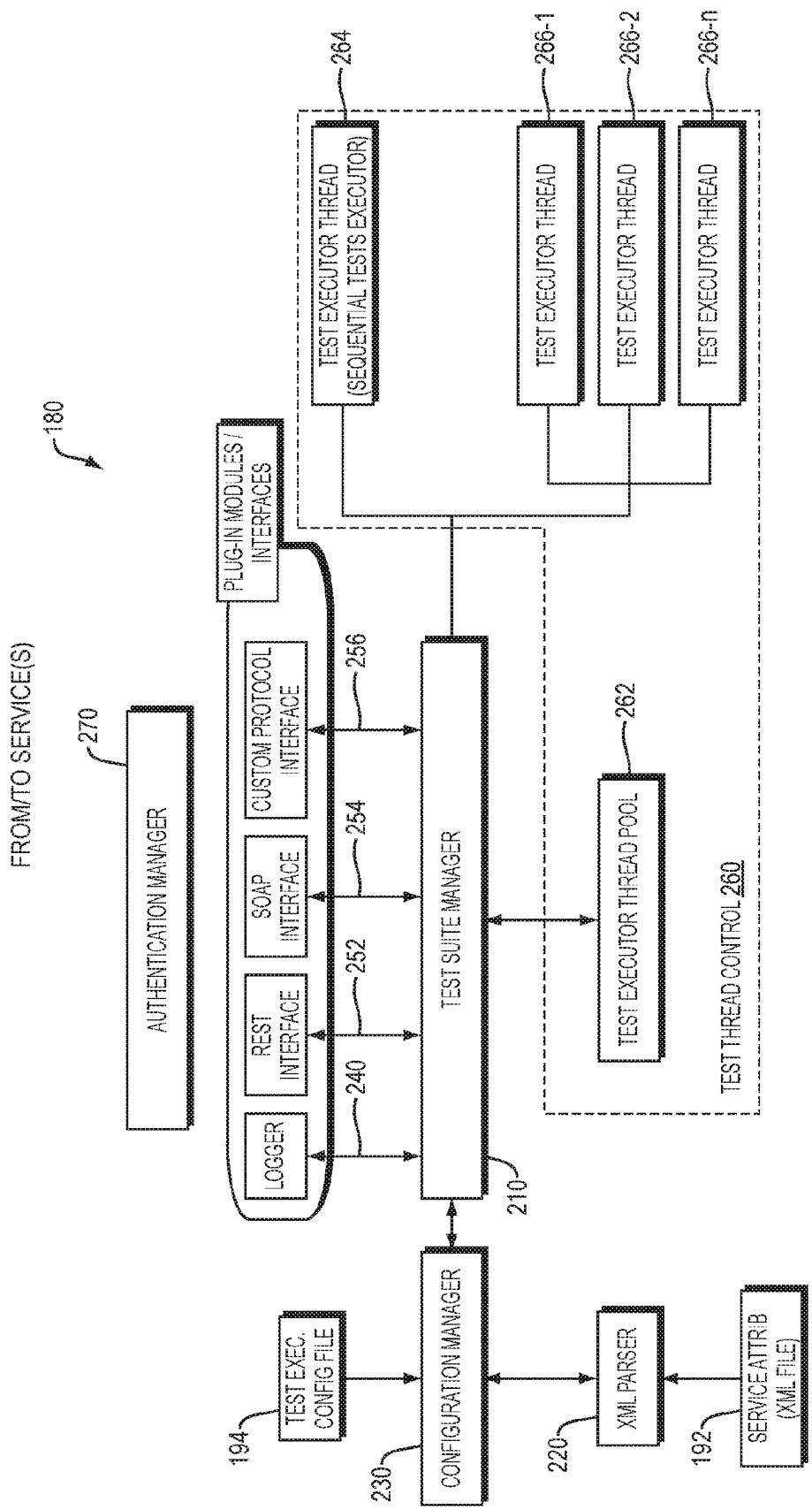
FIG. 2 is a more detailed view of a test suite executor.

FIG. 2 is a more detailed view of the test suite executor 180. It includes a test suite manager 210, XML parser 220, configuration manager 230, logger 240, one or more plug-in modules 250 for various interface types, a test thread controller 260 and authentication manager 270.

The test suite manager 210 manages execution of the tests as defined by the service attribute file(s) 192 and test execution configuration file(s) 194.

XML parser 220 accepts a service attribute file 192 as input and parses it to provide server and service access information to the configuration manager 230. Configuration manager 230 also processes the test execution configuration file 194 to is determine parameters of the test, such as hardware configuration types or execution sequencing.

The test suite manager 210 takes the information parsed from the SA and TE files to determine a sequence of steps needed to execute a test program for a specific server interface.

Execution of threads is managed by the test executor thread pool 262 which utilizes a sequential test executor 264 and/or parallel test executor 266 to spawn, manage, and close test program threads as may be specified by the TE file.

The authentication manager 270 may store tokens and other information to maintain access parameters provided in responses that are needed for subsequent requests. One manner of handling these is discussed in more detail below.

The architecture of FIG. 2 further leverages one or more plug-in modules for each interface. For example, a REST plug-in 252, SOAP plug-in 254, and custom protocol plug-in 256 may be provided.

When a given plug-in receives a request from a test executor 180 thread, it formats the request in the specified way, addresses it to the service using the specified protocol, receives a response, and extracts elements of the response back to the test executor 180.

Also, a logger plug-in 240 may log responses (such as to an e-mail recipient) as specified by the service attribute file 192.

Figure 3:
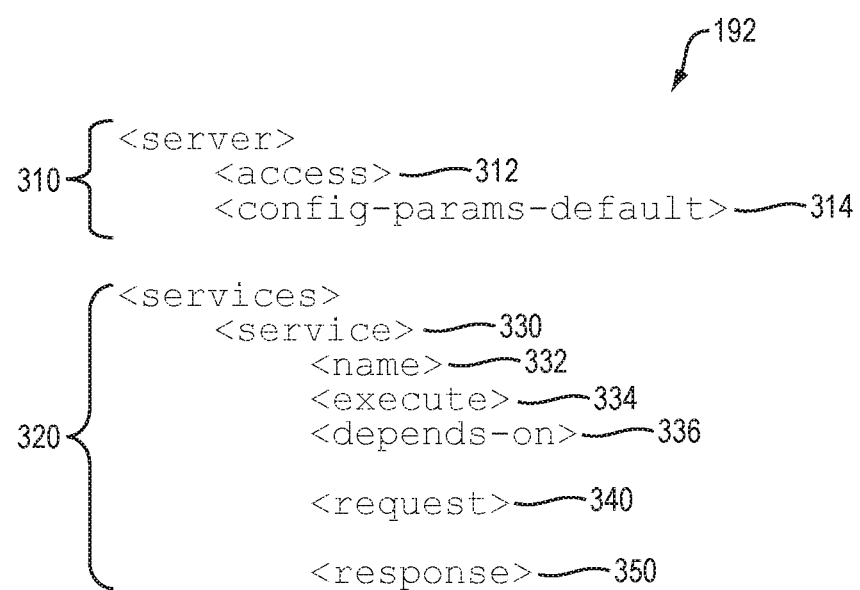
FIG. 3 is a high-level abstraction of a Service Access (SA) file.

FIG. 3 is a high level representation of the essential contents of an example Service Attributes (SA) file 192. Element types include a server element 310 and at least is one services element 320. The server element (tag) 310 further defines access parameters 312 and parameter defaults 314. In general, the server element 310 defines where the server is where it is hosted, what port it is accessible on, what kind of protocol it is running.

The services element (tag) 320 is used to define one or more services that the server supports. A services tag 320 may include one or more service elements 330. A service tag 330 is provided for each of several possible services to be tested. There may be multiple service tags 330, and the order of service elements defines a test execution order. An example service tag 330 includes a name 332 of the service (such as to be included to identify a log entry), whether or not the service should be executed 334, and whether it depends on another service 336. A request 340 tag is provided for testing each service. There may be one or more response tags 350 associated with each request tag 340, corresponding to one or more expected response codes.

FIG. 4 is a more detailed example or "skeleton" of a Service Attribute file 192 "skeleton" that illustrates each of the possible elements or tags in more detail.

The server tag 310 elements include a user-friendly name 401 for the server. The user-friendly name is stored by the test suite manager to identify entries in a log file.

Also provided in a server tag 310 are a number of tags used to communicate with the server. These include an address tag 402 such as an IP address or Uniform Resource Identifier (URI) for locating the server, a port number 403, and a messaging protocol 404. For example the protocol can be selected from a group including HTTP, HTTPS, TCP, UDP, or the like. Another tag specifies a service type 405 to identify a type of API used to access the service. These may include SOAP, REST, IRC or other custom API type. The message format tag 406 identifies a default format of the messages to be sent to the server. These may be XML, text, binary, JSON or other formats.

Also specified in the skeleton configuration parameters are configuration parameter defaults 407. These parameters are used as defaults when accessing any service exposed by the server. These parameters can be overridden by specific response request pairs. Example configuration parameters may include a token name, a value, and parameter type. In the example shown here the parameter includes Web Services Definition Language (WSDL), a stub, a URI prefix, a URI suffix and the like. The default configuration parameters may be used to uniquely define the service instance running on the server. For example, tokens can be specified that uniquely identify a particular thread.

Configuration parameters 407 provide additional flexibility. This construct is provided so that certain headers or other parameters can be defined as part of the server parameters and these will be picked up in various requests made to the server or responses received from it. These can for example be used for authentication when a service cannot execute until it receives a necessary authentication token provided by a previously executed service.

FIG. 4 also shows an example service tag 330 in more detail. A name tag 420 defines a user-readable tag for the service entered into a log file when the service is invoked. Also implied in FIG. 4 is that there can be more than one service 330 associated with the services tag 320. The different services will thus generally be invoked in the same order as they are listed in the SA file to define a particular flow for the test.

The execute tag 421 determines whether not a service is to be executed in a given iteration of the test. The execute tag 421 thus allows the flexibility of switching each service test ON or OFF without having to reconstruct the list of services each time. At a very high level the user 120 can also specify that she wishes all of the services to be is tested in parallel or she can specify that they are to be run in a sequence; but as will be described in detail below, this is controlled outside the scope of the SA file 192 and is a parameter of the TE file 194. The execute tag can thus be toggled ON or OFF to control the services test flow without having to reconfigure other test program logic.

As explained previously, the depends-on tag 422 includes a list of one or more other services for which an output must be received before the present service test will be executed. In one example, it is sometimes necessary for a test thread to have previously logged into a service before some other service can be accessed. The depends-on tag can also be used as a mechanism ensure that a particular token is exchanged with the server before sending any other requests. So the depends on tag 422 can also be used to change the test sequence.

Also shown in FIG. 4 are a particular request-response pair. Each request 430 may be given a name 431 a URI, service, or API being tested. The format 432 of the request can also be specified here, but if it is not defined, then the server default format may be used. Next, parameters 435 are provided for the request. Each parameter may be given a name, a value, and value type (such as integer, long integer, floating, string, Boolean, a URI parameter, HTTP body as header and the like). Again, the names are logged when encountered by the test executor 180.

A response tag 440 defines expected status codes 441 and other status information 442 to be returned by the corresponding request 430 in a defined format 443. Responses may also specify parameters 444 such as their names, parameter values, and types.

Several example SA files illustrate how the same generic framework of FIG. 4 can be used for testing different service interface types and protocols.

A first example SA XML file shown in FIGS. 5-1 through 5-4 tests login/logout services using a REST protocol and JSON command format.

FIG. 5-1 is a high-level view of the SA XML file showing the server tags including a name of the server, its IP address, specified protocol (that being HTTP in this example) the service type (REST), a port number, and the JSON command formats. There is also a default configuration parameter specified including a URI prefix that will be added to each request made to the server.

The server exposes three services, as suggested by the eclipses in the collapsed view of FIG. 5-1. These three services will now be described in more detail in connection with FIGS. 5-2 to 5-4.

FIG. 5-2 shows the specification for a login service in more detail. A first execute tag is set to TRUE. The request tag includes a name of the service for the log (here the service being tested is LOGIN). Parameters for the test include an HTTP_username with a specific value and an HTTP_password also with a specific value. Note that the HTTP header value type, and HTTP_method specified as a GET command to be sent to the server.

The expected response tag includes a status code of 200. When the LOGIN is successful, the return status is SUC- CESS in the format of a JSON which will return an authorization token (AUTH_TOKEN) as a string. The authorization token is further maintained by the authentication manager 272 to further control subsequent access to the service.

FIG. 5-3 shows a second service tag that may be used to test a create user feature that returns user name information. Here the service depends-on a prior LOGIN service. The request tag, besides specifying the JSON format, includes parameters such as the authorization token provided by the prior successful login, a name for the new user, and their email address. The successful response code of 200 also returns a USER_ID parameter string.

FIG. 5-4 is third service tested using the REST API. This service depends on both a prior successful login and create user requests. Here the service is one that fetches the email address for a previously enrolled user. The parameters of the request include the login authorization token and whether or not the specified USER_ID is ACTIVE as specified by the true parameter. A successful response will return a status code of 200 in a JSON format with a parameter indicating the user's email address as a string.

FIG. 6-1 as an example SA file for testing a Web service such as an API-enabled Google search service. As shown in FIG. 6-1, the protocol type is specified as SOAP, the port number is 443 and the default command format is XML. Default configuration parameters include the URI prefix "/api/ver1/soap" and a WSDLS path of http://cs.au.dk/~amoeller/WWW/webservices/.

FIG. 6-2 shows an example request tag for the Google search service. It may include a number of parameters such as a key, query, start value, maximum number of results, filter parameters, whether or not the search should be restricted to safe search, and other parameters typical of a Google search.

FIG. 6-3 illustrates the response tag. The parameters returned include a directory category, viewable name, any special encoding, the search result data as a type array, and search time as a double integer.

FIG. 7-1 shows the XML framework including address, protocol, service-type and port number for testing an interface to an Internet Relay Chat (IRC) service. The service tested as shown in FIG. 7-2 is a JOIN chat request, and includes parameters such as a channel name and key value to access the channel. The expected a response may include string "RPLTOPIC". FIG. 7-3 illustrates another request response pair for the IRC example, a PING send to a user "wizkid". The expected response is a text string with value PONG. FIG. 7-4 is a final request-response pair for the IRC example, and tests a QUIT command.

FIG. 8 is an example service attribute XML file for testing a Remote Method Invocation (RMI) interface. Here the server exposes a service that can be accessed using the RMI protocol on port 1099 to add two numbers together. The request specifically tests adding "3" and "2" and expect a successful response to return "5" as an integer value.

FIG. 9 illustrates an example Test Execution (TE) file 194. Elements of this file may specify server attributes 900, thread pool attributes 910, log file attributes 920, other items 930, and test configuration attributes 940. The TE file may be provided as a text file, an XML file, or some other convenient human-readable format.

The server attributes 900 are used to prepare a testing environment that comprises hosts (physical or virtual) with the provided configuration of each. The configured host(s) are then used for testing the service. The server attributes 900 may include an operating system, memory, CPU speed, and number of cores of the test execution host. The server count attribute may define how many hosts are to be used for testing the service (with a default value of 1).

The thread pool attributes 910 specify how the tests are to be run. For example, the tests of the service may be single or multithreaded as discussed above in connection with FIG. 2. The test suite manager 210 uses this information to control the text executor thread pool 262 to control how many tests are run at the same time on the server.

A further logger element 920 of the TE file defines where log file entries should be stored and their parameters such as a backup count, and an error severity level (information only/debugging/or warning level logging).

Other elements 930 may specify an email address for receiving various alerts, log files, etc. and how frequently such messages should be sent. In one example, the email address may be specified for event notification, such as in a case where the service is found not to be working as expected. The notification email may be directed to a party that is concerned with operating the service.

Test configuration elements 940 define a number of iterations, that is, a number of times that each test specified by an SA file should be run, the delay between iterations, and whether the test should run sequentially or in parallel.

FIG. 10 is an example graphical user interface presented to user 120 via test portal 170. The user interface screen presented here may be utilized by the user 120 to define the contents of Services Attribute (XML) file 192.

The example user screen input boxes 1001 allow user to specify a name, address and port number for the hosting services to be tested.

Drop-down type input boxes 1011 may specify a protocol, service type and message format, presently only a limited number of available choices. For example, the service type drop down box would only be populated with services that correspond to the available plug-ins 252, 254, 256 (FIG. 2).

Server configuration parameters 1020 may also be specified including the name, a type, and values as defaults for the services configuration section for each of the services to be tested. The user may create a list of services, whether or not they depend on some other service, and the execute attribute details for each service. The resulting list of services can appear in an area 1030 at the bottom of the screen.

Details for each service may be further specified by activating the service details button for each service which opens a screen such as shown in FIG. 11. Here are the details for each service may be specified and include items such as the name 1110 of the service as well as information to build the a list of request-response tags. In this particular example the user 120 is inputting the parameters of a LOGIN service accessed via an HTTP GET method which turns a success value of 200 and email string.

Figure 12:
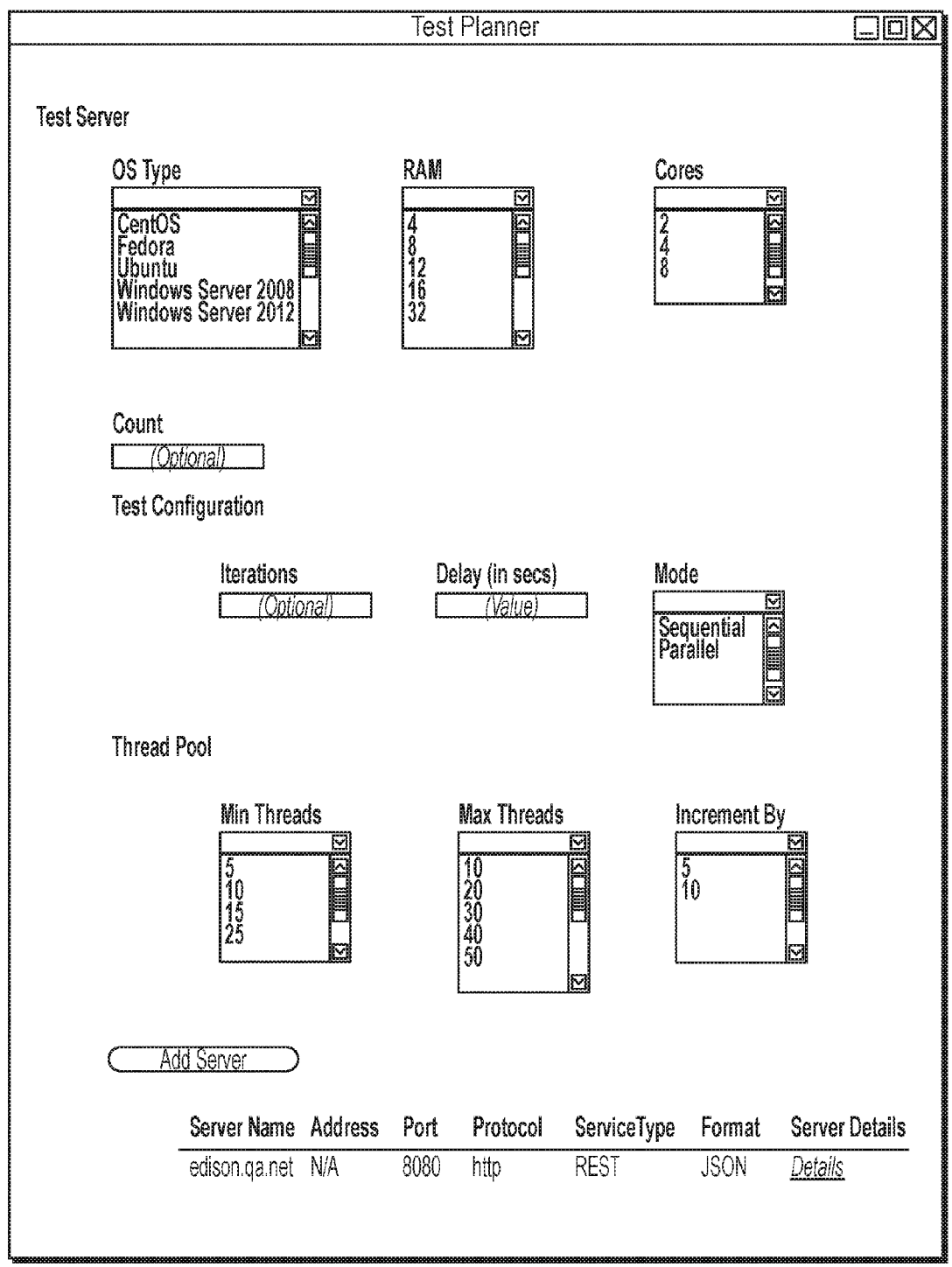
FIG. 12 is an example user interface for specifying attributes of a TE file.

The test planner user interface screen of FIG. 12 may be used to specify the comments/details of the test executor (TE) configuration file 194 associated with a particular server. Here input boxes are provided for operating system type, CPU, memory, cores and count, as well as whether the services in the XML file should be run sequentially or in parallel. Aspects of the thread execution (multi- or single threaded) are also specified.

In addition one or more servers can be added to the test plan (such as via the input on the bottom of FIG. 12) The "server details" input control then exposes these server configurations if needed.

It can now be appreciated how a generic test facility can abstract service access details from test executing attributes. As a result the designer of a test protocol need only populate a configuration file with service interface specific details. The framework then extracts this information and automatically generates a test suite based on the the list of service actions and, optionally, test execution parameters provided in a different file.

Because it accesses the services under test via a network port, this test facility can be structured to run over a cloud solution, allow anyone to utilize it to test any service interface accessible on the Internet. The test suite executor may itself exists as a service available in the cloud, and may even provide graphical user interface screens as shown in FIGS. 10-12 as a cloud service.

What is claimed is:

1. A method for providing a generic framework for executing a test of an interface to a service, wherein service access (SA) attributes are stored in a service access (SA) interface configuration file, and from test execution (TE) attributes stored in a separate TE configuration file such that the SA attributes are independently stored from the TE attributes, the method comprising:
    interpreting the service access (SA) interface configuration file having multiple tags including at least one server tag and one or more service tag for further:
    determining, from the at least one service tag:
        protocol and address information for a server that provides the interface to the service;
        a service type;
        configuration parameter defaults; and
    determining, from each service tag:
        a name of a corresponding service;
        a request configuration for issuing a command to the corresponding service;
        a response configuration for an expected response to the command to the corresponding service;
        wherein the request configuration and response configuration are arranged in pairs and associated with the name of a corresponding service in each service tag;
    interpreting the test execution (TE) configuration file to determine execution attributes of running the test of the service interface, wherein the TE configuration file includes one or more test execution attributes selected from the group consisting of
    running the test asynchronously or synchronously, number of iterations of the test, or
    running the test multiple times sequentially or in parallel; and
    executing the test against the corresponding service by:
        issuing a request message to the corresponding service interface indicated in at least one service tag, using the name of the corresponding service, the protocol and address information and the request configuration; and
        receiving a response message from the service;
        comparing the response message to the corresponding expected response in the response configuration; and
    further controlling the step of executing the test according to the attributes in the TE configuration file.

2. The method of claim 1 wherein the address information in the SA file includes a uniform resource identifier and port number.

3. The method of claim 1 wherein the at least one service tag additionally indicates a message format used to access the server.

4. The method of claim 1 wherein the at least one service tag additionally indicates parameters to be used in place of parameter defaults for either the request or response configuration.

5. The method of claim 1 wherein the response configuration additionally specifies a status code indicating a server condition.

6. The method of claim 5 wherein the at least one service tag additionally indicates a condition or a dependency, and the step of comparing the response message to the response configuration depends on the condition or dependency.

7. The method of claim 6 wherein the condition or dependency is defined by data or state information shared between two services.

8. The method of claim 1 wherein the test configuration file further specifies aspects of executing the test including one or more of:
    server hardware parameters, or
    logging output from the tests.

9. The method of claim 1 wherein the service is a cloud service.

10. The method of claim 1 wherein the step of running the test executes as a cloud service.

11. The method of claim 1 wherein the at least one service tag additionally comprises a depends-on parameter that specifies another service from which an output must be received before executing the test of the corresponding service.

12. The method of claim 1 wherein the at least one service tag additionally comprises a depends-on parameter that specifies a token exchange with another service before executing the test of the corresponding service.

13. The method of claim 1 wherein the at least one service tag additionally comprises an execute tag that controls whether the corresponding service is tested on a given iteration of the test.

* * * * *